US012630182B2

(12) United States Patent
Liu et al.

(10) Patent No.: US 12,630,182 B2
(45) Date of Patent: May 19, 2026

(54) METHOD FOR AUTOMATIC DRIVING AT INTERSECTION, ELECTRONIC DEVICE, STORAGE MEDIUM AND AUTOMATIC DRIVING VEHICLE

(71) Applicant: Apollo Intelligent Driving Technology (Beijing) Co., Ltd., Beijing (CN)

(72) Inventors: Qiyu Liu, Beijing (CN); Zhongpu Xia, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 687 days.

(21) Appl. No.: 18/090,743

(22) Filed: Dec. 29, 2022

(65) Prior Publication Data

US 2023/0138704 A1 May 4, 2023

(30) Foreign Application Priority Data

Mar. 11, 2022 (CN) .......................... 202210244242.X

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 30/18159;
(Continued)

(56) References Cited

U.S. PATENT DOCUMENTS 10,759,422 B2 9/2020 You
10,780,881 B2 9/2020 You
(Continued)

FOREIGN PATENT DOCUMENTS

CN 107972665 A 5/2018
CN 109878513 A 6/2019
(Continued)

OTHER PUBLICATIONS

Official Communication issued in corresponding Chinese Patent Application No. 202210244242.X, mailed on Aug. 2, 2022.
(Continued)

*Primary Examiner* — Abby J Flynn
*Assistant Examiner* — Matthew John Moscola
(74) *Attorney, Agent, or Firm* — Keating & Bennett, LLP

(57) ABSTRACT

A method for automatic driving at an intersection, an electronic device, storage medium, and an automatic driving vehicle, which relate to a field of a data processing technology, in particular to a field of automatic driving. The method includes: determining a first initial convergence location information between an obstacle and a vehicle, a current location information of the obstacle, and an orientation information of the obstacle; determining a target convergence location information between the obstacle and the vehicle according to the first initial convergence location information, the current location information of the obstacle and the orientation information of the obstacle; determining a target travelling plan from a plurality of candidate travelling plans for the vehicle according to the target convergence location information and a current travelling parameter of the obstacle; and controlling the automatic driving of the vehicle according to the target travelling plan.

14 Claims, 5 Drawing Sheets

(51) Int. Cl.
 *B60W 30/095* (2012.01)
 *B60W 30/18* (2012.01)
(52) U.S. Cl.
 CPC ... *B60W 30/18159* (2020.02); *B60W 2552/53* (2020.02); *B60W 2554/4041* (2020.02); *B60W 2554/4044* (2020.02); *B60W 2554/80* (2020.02)
(58) Field of Classification Search
 CPC ..... B60W 2552/53; B60W 2554/4041; B60W 2554/4044; B60W 2554/80; B60W 30/08; B60W 30/095; B60W 30/0953; B60W 30/18154; B60W 50/0097; B60W 50/0098; B60W 60/0017; B60W 2050/0043; B60W 2552/50; B60W 2554/40; B60W 2554/4029; B60W 2554/4045; B60W 2554/4049; G08G 1/0112; G08G 1/0133; G08G 1/0145; G08G 1/052; G08G 1/164; G08G 1/166
 See application file for complete search history.

(56) References Cited

U.S. PATENT DOCUMENTS

| | | | |
|---|---|---|---|
| 11,273,848 B2 | 3/2022 | Hao et al. | |
| 12,291,240 B1* | 5/2025 | Morales Morales | ... G06F 30/20 |
| 2010/0121576 A1* | 5/2010 | Aso | ........................... G08G 1/16 |
| | | | 701/300 |
| 2018/0099665 A1 | 4/2018 | You | |
| 2019/0004517 A1* | 1/2019 | Xia | ..................... G05D 1/0088 |
| 2019/0126920 A1 | 5/2019 | You | |
| 2019/0329771 A1 | 10/2019 | Wray et al. | |
| 2020/0290642 A1 | 9/2020 | Hao et al. | |
| 2021/0129865 A1* | 5/2021 | Jeong | ..................... G08G 1/162 |
| 2021/0271901 A1 | 9/2021 | Garimella et al. | |
| 2022/0032906 A1* | 2/2022 | You | ................... B60W 30/0956 |
| 2022/0055616 A1 | 2/2022 | King et al. | |
| 2023/0278572 A1* | 9/2023 | Stent | ..................... B60W 50/14 |
| | | | 701/23 |
| 2024/0375682 A1* | 11/2024 | Li | ..................... B60W 50/0098 |
| 2025/0083669 A1* | 3/2025 | Kasuya | ............ B60W 30/0956 |

FOREIGN PATENT DOCUMENTS

| | | |
|---|---|---|
| CN | 113753077 A | 12/2021 |
| JP | 2017-058774 A | 3/2017 |

OTHER PUBLICATIONS

Official Communication issued in corresponding Chinese Patent Application No. 22216957.5, mailed on Jun. 29, 2023.

* cited by examiner

100

200

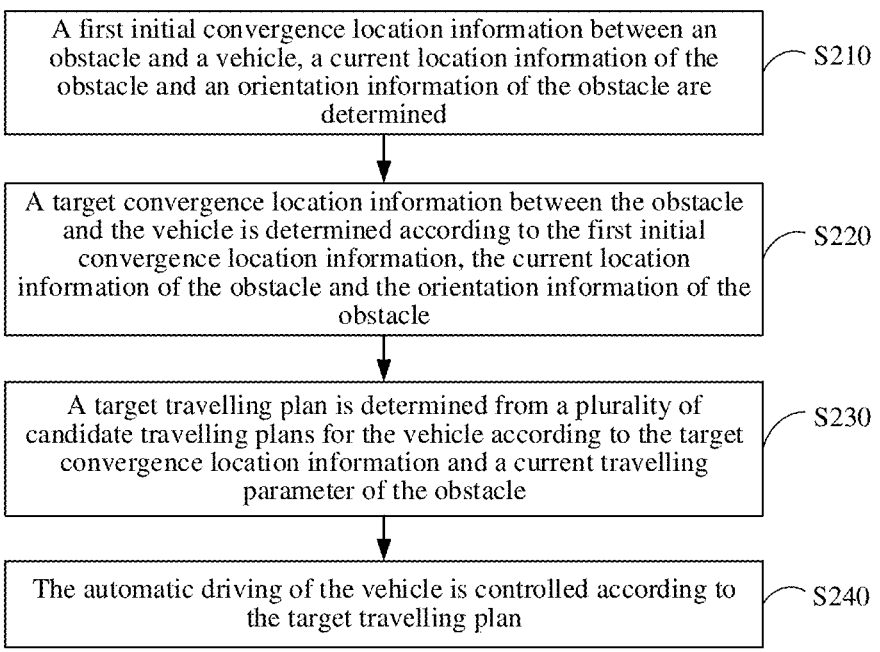

| | |
|---|---|
| A first initial convergence location information between an obstacle and a vehicle, a current location information of the obstacle and an orientation information of the obstacle are determined | S210 |
| A target convergence location information between the obstacle and the vehicle is determined according to the first initial convergence location information, the current location information of the obstacle and the orientation information of the obstacle | S220 |
| A target travelling plan is determined from a plurality of candidate travelling plans for the vehicle according to the target convergence location information and a current travelling parameter of the obstacle | S230 |
| The automatic driving of the vehicle is controlled according to the target travelling plan | S240 |

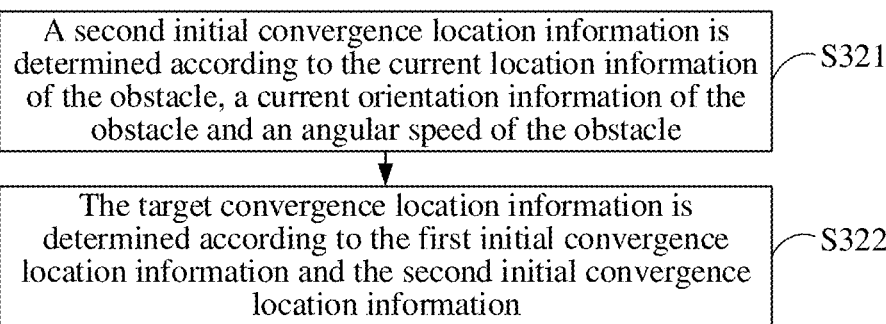

| | |
|---|---|
| A second initial convergence location information is determined according to the current location information of the obstacle, a current orientation information of the obstacle and an angular speed of the obstacle | S321 |
| The target convergence location information is determined according to the first initial convergence location information and the second initial convergence location information | S322 |

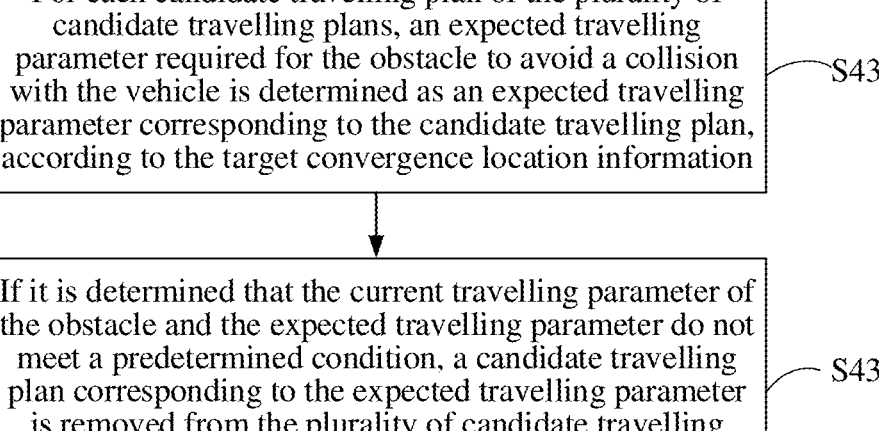

For each candidate travelling plan of the plurality of candidate travelling plans, an expected travelling parameter required for the obstacle to avoid a collision with the vehicle is determined as an expected travelling parameter corresponding to the candidate travelling plan, according to the target convergence location information — S431

If it is determined that the current travelling parameter of the obstacle and the expected travelling parameter do not meet a predetermined condition, a candidate travelling plan corresponding to the expected travelling parameter is removed from the plurality of candidate travelling plans, so as to obtain a plurality of remaining candidate travelling plans — S432

The target travelling plan is determined from the plurality of remaining candidate travelling plans — S433

First determination module —610

Second determination module —620

Third determination module —630

Control module —640

700

701
Computing unit

702
ROM

703
RAM

704

705
I/O interface

706
Input unit

707
Output unit

708
Storage unit

709
Communica-tion unit

1

METHOD FOR AUTOMATIC DRIVING AT INTERSECTION, ELECTRONIC DEVICE, STORAGE MEDIUM AND AUTOMATIC DRIVING VEHICLE

This application claims priority to Chinese Patent Application No. 202210244242.X, filed on Mar. 11, 2022, the entire content of which is incorporated herein in its entirety by reference.

TECHNICAL FIELD

The present disclosure relates to a field of data processing technology, and in particular, to a field of automatic driving technology. More specifically, the present disclosure provides a method for automatic driving at an intersection, an electronic device, a storage medium, and an automatic driving vehicle.

BACKGROUND

In a complex traffic environment, an automatic driving vehicle needs to determine a theoretical location of a surrounding obstacle in a future period of time according to a travelling parameter such as a location, a speed and an acceleration of the surrounding obstacle, and determine its own travelling plan based on the theoretical location of the obstacle. The automatic driving vehicle needs to accurately determine the theoretical location of the obstacle to ensure a safety of a planned travelling plan.

SUMMARY

The present disclosure provides a method for automatic driving at an intersection, an electronic device, a storage medium, and an automatic driving vehicle.

According to an aspect of the present disclosure, a method for automatic driving at an intersection is provided, including: determining a first initial convergence location information between an obstacle and a vehicle, a current location information of the obstacle, and an orientation information of the obstacle; determining a target convergence location information between the obstacle and the vehicle according to the first initial convergence location information, the current location information of the obstacle and the orientation information of the obstacle; determining a target travelling plan from a plurality of candidate travelling plans for the vehicle according to the target convergence location information and a current travelling parameter of the obstacle; and controlling the automatic driving of the vehicle according to the target travelling plan.

According to another aspect of the present disclosure, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the method provided by the present disclosure.

According to another aspect of the present disclosure, a non-transitory computer-readable storage medium having computer instructions therein is provided, and the computer instructions are configured to cause a computer system to implement the method provided by the present disclosure.

According to another aspect of the present disclosure, an automatic driving vehicle is provided, including the electronic device described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which:

FIG. 2 shows a schematic flowchart of a method for automatic driving at an intersection according to embodiments of the present disclosure;

FIG. 3 shows a schematic flowchart of determining a target convergence location information according to embodiments of the present disclosure;

FIG. 4 shows a schematic flowchart of determining a target travelling plan according to embodiments of the present disclosure;

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following descriptions.

Figure 1:
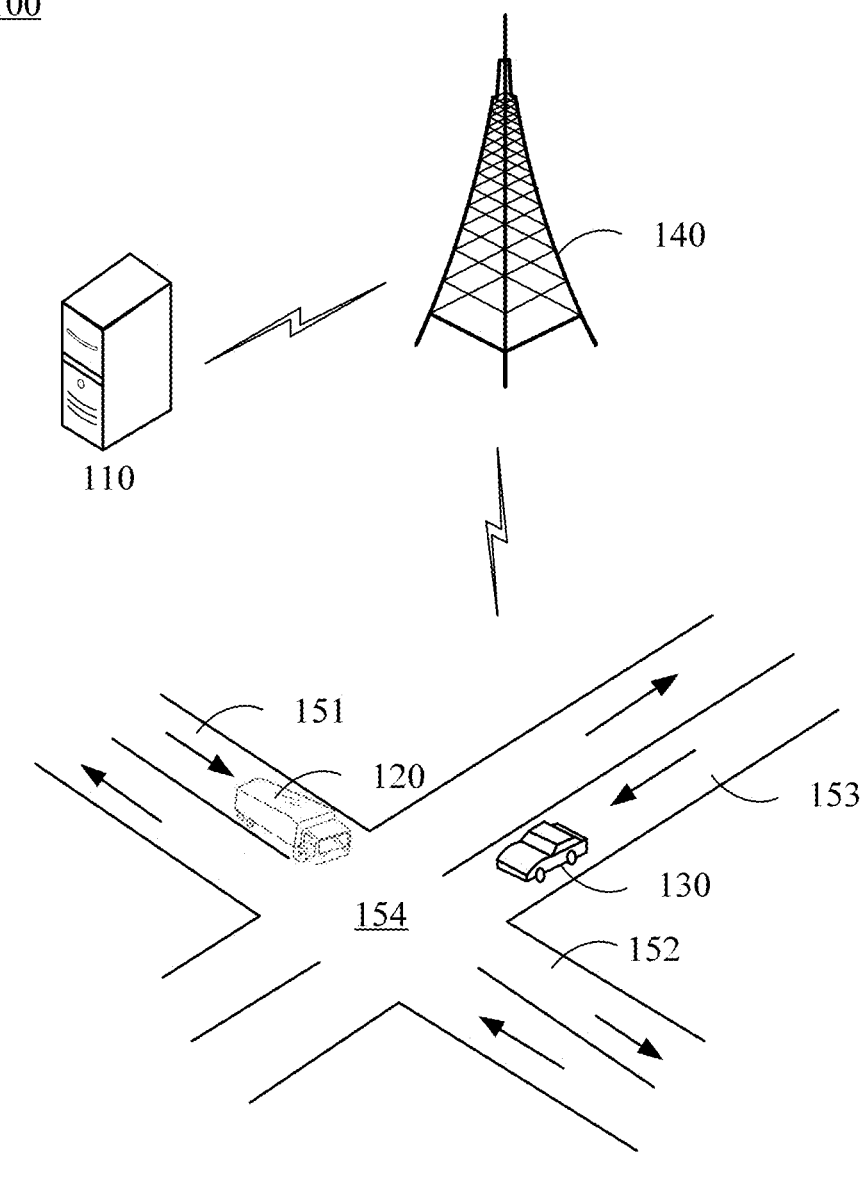
FIG. 1 shows a schematic diagram of an application scenario of a method and an apparatus for automatic driving at an intersection according to embodiments of the present disclosure.

FIG. 1 shows a schematic diagram of an application scenario of a method and an apparatus for automatic driving at an intersection according to embodiments of the present disclosure.

It should be noted that FIG. 1 is merely an example of a system architecture to which embodiments of the present disclosure may be applied to help those skilled in the art understand the technical content of the present disclosure, but it does not mean that embodiments of the present disclosure may not be applied to other devices, systems, environments or scenarios.

As shown in FIG. 1, a scenario 100 of such embodiments includes a server 110, a vehicle 120 travelling on a road, an obstacle 130, a communication base station 140, and a road traffic network. The road traffic network may include roads (such as roads 151, 152, 153), and an intersection 154 formed by a convergence of the roads. Arrows shown in FIG. 1 indicate travelling directions on the roads.

For example, in the scenario 100, the vehicle 120 travelling on the road may be an automatic driving vehicle. The obstacle 130 may be a pedestrian or other vehicles around the automatic driving vehicle. For example, the vehicle 120 may go straight along the road 151 and pass the intersection 154, and the obstacle 130 needs to travel from the road 153 to the intersection 154 and turn left onto the road 152.

The vehicle 120 may be equipped with an automatic driving system to detect a travelling parameter of the obstacle 130, such as a current speed of the obstacle 130, a current acceleration of the obstacle 130 and a current orientation information of the obstacle 130; and determine a target travelling plan for the vehicle 120 according to the travelling parameter of the obstacle 130. The vehicle 120 may upload data to a background server through the communication base station 140. The server 110 may, for example, request data from the background server through a network to acquire the data uploaded by the vehicle 120.

It should be noted that the method for automatic driving at the intersection provided by embodiments of the present disclosure may be performed by the vehicle 120. Accordingly, the apparatus for automatic driving at the intersection provided by embodiments of the present disclosure may be provided in the vehicle 120. The method for automatic driving at the intersection provided by embodiments of the present disclosure may also be performed by the server 110. Accordingly, the apparatus for automatic driving at the intersection provided by embodiments of the present disclosure may also be provided in the server 110.

It should be understood that a number and a type of server, roads, vehicle, obstacle and communication base station shown in FIG. 1 are merely illustrative. According to implementation needs, any number and type of servers, roads, vehicles, obstacles and communication base stations may be provided.

FIG. 2 shows a schematic flowchart of a method for automatic driving at an intersection according to embodiments of the present disclosure.

As shown in FIG. 2, a method 200 for automatic driving at an intersection may include operation S210 to operation S240.

In operation S210, a first initial convergence location information between an obstacle and a vehicle, a current location information of the obstacle and an orientation information of the obstacle are determined.

For example, the vehicle may be an automatic driving vehicle, and the obstacle may be another vehicle travelling on the road or a pedestrian on the road.

The current location information of the obstacle indicates a current geographical location of the obstacle. The current location information of the obstacle may be determined through a sensing module equipped on the vehicle, and the sensing module may be implemented through a camera apparatus, a radar, or the like.

The orientation information of the obstacle may include a current orientation information, and the current orientation information may indicate a direction in which the obstacle is facing, for example, facing due north, 30 degrees north by west, and so on. The orientation information may include an angular speed of the obstacle.

The first initial convergence location information may indicate an intersection point of a travelling route of the vehicle and a travelling route of the obstacle. For an automatic driving vehicle, at least one travelling route of the vehicle may be pre-planned based on a location information of a starting point, a location information of a destination, and a navigation. Pre-planning one travelling route is illustrated by way of example in describing embodiments of the present disclosure. When a plurality of travelling routes are planned for the vehicle, a same processing may be performed on the plurality of travelling routes. For a travelling route of the vehicle, a first initial convergence location may be determined by a prediction module equipped on the vehicle, and an implementation of the prediction module is not limited in embodiments of the present disclosure.

In practical applications, the first initial convergence location information may exist in some predetermined scenes. For example, the predetermined scenes may include that going straight meets turning left, going straight meets turning right, going straight meets turning around, and so on. In some other scenes, for example, in which the vehicle and the obstacle travel on two adjacent straight roads, there may be no first initial convergence location information. Therefore, operation S210 may be performed when it is determined that a current scene meets the predetermined scene. Taking the scene in which going straight meets turning left as an example, it may be determined that the current scene meets the scene in which going straight meets turning left, when the following condition is met: both the vehicle and the obstacle are located at the intersection, the vehicle needs to go straight, the obstacle is located on a reverse lane in front of a left side of the vehicle, and the obstacle has a travelling intention of turning left.

In operation S220, a target convergence location information between the obstacle and the vehicle is determined according to the first initial convergence location information, the current location information of the obstacle and the orientation information of the obstacle.

For example, with the current location information of the obstacle as a starting point, a straight line may be drawn along the direction that the obstacle is facing. The straight line intersects the travelling route of the vehicle at an auxiliary intersection point, and then a midpoint of a line connecting the auxiliary intersection point and the first initially determined convergence location may be determined as the target convergence location.

In operation S230, a target travelling plan is determined from a plurality of candidate travelling plans for the vehicle according to the target convergence location information and a current travelling parameter of the obstacle.

In an example, the current travelling parameter may include at least one selected from a speed and an acceleration, and embodiments of the present disclosure do not limit whether the acceleration is positive or negative.

The automatic driving vehicle may pre-plan at least one travelling route of the vehicle based on the location information of the starting point, the location information of the destination and the navigation. In addition, a plurality of candidate travelling plans may be determined for each of the at least one travelling route. Taking one of the travelling routes as an example, a plurality of candidate travelling plans all indicate that the vehicle may travel along the travelling route, and different travelling parameters such as speed and acceleration are adopted by the plurality of candidate travelling plans. For example, one candidate travelling plan is to drive along the travelling route at a uniform speed of 10 m/s for 10 seconds, and another candidate travelling plan is to drive along the travelling route at a uniform acceleration of 1 m/s$^2$ for 10 seconds, and then drive along the travelling route at a uniform speed of 50 m/s for 3 seconds.

In operation S240, the automatic driving of the vehicle is controlled according to the target travelling plan.

For example, the travelling of the vehicle may be controlled according to the travelling parameter involved in the target travelling plan.

In some technical solutions, the first initial convergence location information may be used as the target convergence location information, and the target travelling plan may be determined based on the first initial convergence location information. It should be noted that in practical applications, an error may exist between a theoretical location of the obstacle determined by the automatic driving vehicle and an actual location of the obstacle. For example, a distance between the theoretical location of the obstacle three seconds later determined by the automatic driving vehicle and the actual location of the obstacle three seconds later may be greater than 1 meter.

Therefore, with the above technical solutions, some errors may exist in the first initial convergence location information determined by the prediction module of the vehicle. For example, an intersection point of a route passed by the vehicle during an actual travelling process and a route passed by the obstacle during an actual travelling process is referred to as an actual convergence location, and a distance between the actual convergence location and the first initially determined convergence location may be greater than 1 meter. Therefore, if the target travelling plan is determined by using the first initial convergence location information as the target convergence location information, a risk of collision between the vehicle and the obstacle may exist, and a travelling safety of the vehicle is reduced.

Different from the above technical solutions, the technical solution provided by embodiments of the present disclosure may be implemented to correct the first initial convergence location information between the obstacle and the vehicle according to the current location information of the obstacle and the orientation information of the obstacle, so as to obtain the target convergence location information. Then the target travelling plan for the vehicle may be determined based on the target convergence location information. Therefore, the accuracy of the target convergence location information may be improved, and a safer target travelling plan may be determined from a plurality of candidate travelling plans, so as to achieve an effect of improving a vehicle safety.

FIG. 3 shows a schematic flowchart of determining a target convergence location information according to embodiments of the present disclosure.

As shown in FIG. 3, in an embodiment 320, the operation of determining the target convergence location information between the obstacle and the vehicle according to the first initial convergence location information, the current location information of the obstacle and the orientation information of the obstacle may include operation S321 to operation S322.

In operation S321, a second initial convergence location information is determined according to the current location information of the obstacle, a current orientation information of the obstacle and an angular speed of the obstacle.

In an example, with an initial location of the obstacle as a starting point, a straight line may be drawn at a predetermined angle, and an intersection point of the straight line and the travelling route of the vehicle is determined as the second initial convergence location information. The predetermined angle may be a sum of an orientation angle indicated by the current orientation information of the obstacle and an angle variation, and the angle variation may be a product of the angular speed and a unit time.

In another example, a curve may be drawn with the initial location of the obstacle as a starting point, and an intersection point of the curve and the travelling route of the vehicle is determined as the second initial convergence location information.

In operation S322, the target convergence location information is determined according to the first initial convergence location information and the second initial convergence location information.

In embodiments of the present disclosure, the first initial convergence location information may be corrected using the current orientation information of the obstacle and the angular speed of the obstacle, so that more accurate target convergence location information may be obtained.

In an example, a midpoint of a line connecting the first initial convergence location information and the second initial convergence location information may be determined as the target convergence location information.

In another example, the target convergence location information may be determined using Kalman filtering. A basic idea of Kalman filtering is to calculate a target state quantity by using two signal sources, where a first signal source is a sensor state quantity at a current time instant, and a second signal source is a historical state quantity and a control command In such embodiments, the first initial convergence location information may be used as a sensor state quantity $obs_{prection}$ at a current time instant, the current location information of the obstacle may be used as a historical state quantity $obs_{init}$, the angular speed of the obstacle may be used as a control command $obs_{headingspeed}$, and the corrected target convergence location information may be used as a target state quantity $obs_{cutin}$ to be calculated. Accordingly, the operation of determining the target convergence location information according to the first initial convergence location information and the second initial convergence location information may include operations of: determining a probability distribution indicating a correspondence between a candidate convergence location information and a probability, according to the first initial convergence location information and the second initial convergence location information; and determining the target convergence location information according to a mean value of the probability distribution.

For example, according to Bayes Rule, it may be obtained Expression (1):

$$P(obs_{cutin}|obs_{prection}, obs_{headingspeed}, obs_{init}) = \qquad \text{Expression (1)}$$
$$m * P(obs_{prection}|obs_{cutin}) * P(obs_{cutin}|obs_{headingspeed}),$$

where m is a constant.

Further, fitting on the probability distribution of Kalman filtering using a normal distribution may be obtained:

$$P(obs_{prection}|obs_{cutin}) \sim N(\mu 1, \sigma 1^2); \qquad \text{Expression (2)}$$
$$P(obs_{cutin}|obs_{headingspeed}) \sim N(\mu 2, \sigma 2^2), \qquad \text{Expression (3)}$$

where $\mu 1$ represents the first initial convergence location information, $\sigma 1^2$ represents a variance, and a size of al may be adjusted according to an effect of the prediction module in the automatic driving vehicle.

For example, a solution of $\mu 2$ may be modeled by: drawing a straight line at a predetermined angle with the current location information of the obstacle as a starting point, and determining an intersection point of the straight line and the travelling route of the vehicle as μ2. The predetermined angle may be a sum of the orientation angle indicated by the current orientation information of the obstacle and an angle variation, and the angle variation may be a product of an angular speed and a unit time. $\sigma2^2$ is the corresponding variance, and σ2 is an adjustable parameter.

According to Expression (1) to Expression (3), it may be obtained Expression (4):

$$P(obs_{cutin}|obs_{prection}, obs_{headingspeed}, obs_{init}) = m * \qquad \text{Expression (4)}$$

$$N((\sigma1^2\mu2 + \sigma2^2\mu1)/(\sigma1^2 + \sigma2^2), (\sigma1^2\sigma2^2)/(\sigma1^2 + \sigma2^2)).$$

In an example, a mean value of the probability distribution in Expression (4) may be determined as the target convergence location information.

In embodiments of the present disclosure, the probability distribution is determined according to the Kalman filtering, and the target convergence location information is determined according to the mean value of the probability distribution, so that the accuracy of the target convergence location information may be improved.

According to other embodiments of the present disclosure, the operation of determining the target convergence location information according to the mean value of the probability distribution may include: determining an intersection point of lanes according to an information of a lane where the obstacle is located and an information of a lane where the vehicle is located; determining whether a distance between a candidate convergence location information corresponding to the mean value of the probability distribution and the intersection point of the lanes is greater than or equal to a distance threshold; if not, determining the candidate convergence location information corresponding to the mean value of the probability distribution as the target convergence location information; if yes, determining at least one candidate convergence location information whose distance from the intersection point of the lanes is less than or equal to the distance threshold; and determining the target convergence location information from the at least one candidate convergence location information according to the probability distribution.

For example, the information of the lane where the obstacle is located may be determined according to a map. For example, the obstacle has a travelling intention of turning left, and a left-turn lane may be determined as the information of the lane where the obstacle is located. An intersection point of a centerline of the lane where the obstacle is located and a centerline of the lane where the vehicle is located may be used as the intersection point of the lanes.

For example, the distance threshold may be 3 meters. The distance between the candidate convergence location information m corresponding to the mean value of the probability distribution and the intersection point of the lanes is greater than or equal to the distance threshold, which may indicate that the candidate convergence location information m is located outside the lane where the obstacle is located, for example, the obstacle is located outside the left-turn lane. It should be understood that a possibility of the obstacle travelling outside the lane is low, and the distance threshold may be used as a constraint condition for determining the target convergence location information.

For example, a probability value corresponding to each of the at least one candidate convergence location information may be determined according to the probability distribution, so that a plurality of probability values may be obtained. A candidate convergence location information corresponding to a maximum probability value may be determined as the target convergence location information.

In the technical solution provided by embodiments of the present disclosure, it is considered whether the candidate convergence location information corresponding to the mean value of the probability distribution is within the lane, and the target convergence location information is determined according to the lane location information and the probability distribution, so that it may be avoided to determine a target convergence location deviating from the lane, and the accuracy of the target convergence location information may be improved.

FIG. 4 shows a schematic flowchart of determining a target travelling plan according to embodiments of the present disclosure.

As shown in FIG. 4, in an embodiment 430, the operation of determining the target travelling plan from the plurality of candidate travelling plans for the vehicle according to the target convergence location information and the current travelling parameter of the obstacle may include operation S431 to operation S433.

In operation S431, for each candidate travelling plan among the plurality of candidate travelling plans, an expected travelling parameter required for the obstacle to avoid a collision with the vehicle is determined as an expected travelling parameter corresponding to each candidate travelling plan, according to the target convergence location information.

For example, the expected travelling parameter may include at least one selected from a speed, an acceleration, or an accelerating duration.

For example, when the vehicle is travelling according to a candidate travelling plan, the obstacle needs to travel with the expected travelling parameter to ensure that the obstacle may not collide with the vehicle. In an example, a method of avoiding a collision is that the obstacle avoids the vehicle, then a deceleration required for the obstacle to successfully avoid the vehicle may be calculated. For example, when the vehicle is travelling at a uniform speed of 50 m/s, the obstacle needs to travel at an acceleration less than or equal to $-1$ m/s$^2$ so that the obstacle may not collide with the vehicle. In another example, a method of avoiding a collision is that the obstacle does not avoid the vehicle, then an acceleration required for the obstacle to successfully exceed the vehicle may be calculated. For example, when the vehicle is travelling at a uniform speed of 30 m/s, the obstacle needs to travel at an acceleration greater than or equal to 2 m/s$^2$ so that the obstacle may not collide with the vehicle.

In practical applications, a target travelling distance that the obstacle needs to travel from the current location to the target convergence location may be determined according to the target convergence location information and the current location information of the obstacle, and then the expected travelling parameter of the obstacle may be determined according to the target travelling distance.

In operation S432, if it is determined that the current travelling parameter of the obstacle and the expected travelling parameter do not meet a predetermined condition, a candidate travelling plan corresponding to the expected travelling parameter is removed from the plurality of candidate travelling plans, so as to obtain a plurality of remaining candidate travelling plans.

The predetermined condition may indicate that there is a large difference between the current travelling parameter and the expected travelling parameter, and the obstacle needs to be adjusted greatly to avoid a collision with the vehicle. For example, the obstacle needs to brake or accelerate sharply, or the obstacle is currently accelerating and needs to slow down a lot to avoid a collision with the vehicle.

When a candidate travelling plan needs the obstacle to adjust greatly to avoid a collision with the vehicle, the candidate travelling plan for the vehicle may reduce a travelling safety of the obstacle, then the candidate travelling plan may be removed to ensure the safe travelling of the obstacle.

In operation S433, the target travelling plan is determined from the plurality of remaining candidate travelling plans.

In embodiments of the present disclosure, a game theory is adopted to calculate the expected travelling parameter required for the obstacle to avoid a collision with the vehicle, and then a plurality of remaining candidate travelling plans for the vehicle that may avoid a large adjustment to the obstacle may be obtained, so as to improve the travelling safety of the obstacle.

In an example, the target travelling plan may be determined by the following operations. For each candidate travelling plan among the plurality of remaining candidate travelling plans, an evaluation value is determined according to the expected travelling parameter of the obstacle corresponding to the candidate travelling plan, so as to obtain a plurality of evaluation values for the plurality of remaining candidate travelling plans. Then, the target travelling plan may be determined from the plurality of remaining candidate travelling plans according to the plurality of evaluation values.

For example, the evaluation value of the target travelling plan may be determined using a model. An input to the model includes the plurality of remaining candidate travelling plans and the expected travelling parameter of the obstacle corresponding to each remaining travelling plan. The input to the model may further include other obstacle information, such as the current travelling parameters of other vehicles around the vehicle. An output from the model is the evaluation value of each remaining travelling plan. A structure of the model and a specific method of calculating the evaluation value are not limited in the present disclosure.

For example, a weighted sum of a safety evaluation value, a comfort evaluation value and a coherence evaluation value may be used as the evaluation value output from the model. The safety evaluation value is used to evaluate whether the vehicle may collide with a surrounding obstacle when the vehicle is travelling according to the candidate travelling plan, and a collision may reduce the safety evaluation value. The comfort evaluation value is used to evaluate whether a speed change rate of the vehicle is large, and the comfort evaluation value is negatively correlated with the speed change rate. The coherence evaluation value is used to evaluate whether the vehicle alternately accelerates and decelerates in a short period of time. For example, if the vehicle has just accelerated to pass one vehicle and then immediately slows down to avoid another vehicle, a frequent switching between acceleration and deceleration of the vehicle may decrease the coherence evaluation value.

In embodiments of the present disclosure, a game theory is adopted to determine the evaluation value of the candidate travelling plan for the vehicle according to the expected travelling parameter of the obstacle, and determine the target travelling plan based on the evaluation value, rather than determining the target travelling plan according to the expected travelling parameter of the obstacle. Therefore, a frequency of the vehicle unreasonably avoiding the obstacle may be reduced, and then a frequency of a sharp braking of the vehicle may be reduced, so that an experience of a user riding the vehicle may be improved.

It should be noted that the target travelling plan may also be determined from the plurality of remaining candidate travelling plans by using other methods. For example, the current travelling parameter of the current obstacle may be used instead of the expected travelling parameter in the previous embodiment. Specifically, for each candidate travelling plan, the evaluation value may be determined according to the current travelling parameter of the obstacle corresponding to each candidate travelling plan, and then a candidate travelling plan corresponding to a maximum evaluation value may be determined as the target travelling plan.

According to other embodiments of the present disclosure, determining the expected travelling parameter required for the obstacle to avoid a collision with the vehicle according to the target convergence location information may include the following operations. An expected acceleration of the obstacle is determined according to a time length required for the vehicle to travel to the target convergence location information, a current speed of the obstacle, and a travelling distance information required for the obstacle to travel to the target convergence location information.

The method of calculating the expected acceleration is described below by taking the obstacle avoiding the vehicle as an example. In this case, it is required that the obstacle has not reached the target convergence location when the vehicle leaves the target convergence location, then Expression (5) may be obtained.

$$t_g = t_{adc\_cutout} + tau,\qquad\text{Expression (5)}$$

where $t_{adc\_cutout}$ represents a time instant when the vehicle leaves the target convergence location; tau represents a preset buffer duration, which may be set according to requirements, for example, tau is 3 seconds; and $t_g$ represents a duration required for the obstacle to travel from the current location to the target convergence location.

If the obstacle moves at a uniform acceleration and then moves at a uniform speed within the duration $t_g$, then Expression (6) and Expression (7) may be obtained.

$$v_{obs\_init} * t_s + 0.5 * a_{obs} * t_s^2 +\qquad\text{Expression (6)}$$

$$(t_g - t_s) * (v_{obs\_init} + a_{obs} * t_s) < S_{obs\_cutin},$$

$$0 \le t_s,\qquad\text{Expression (7)}$$

where $v_{obs\_init}$ represents a current speed of the obstacle, $t_s$ represents a maximum duration for the obstacle to move at a uniform acceleration, $a_{obs}$ represents an expected acceleration required for the obstacle to avoid a collision with the vehicle, and $S_{obs\_cutin}$ represents a distance the obstacle needs to travel from the current location to the target convergence location.

Therefore, a value range of the expected acceleration of the obstacle may be determined through the above expressions. According to embodiments of the present disclosure, the expected acceleration of the obstacle may be obtained relatively accurately on the basis of ensuring that the obstacle does not collide with the vehicle, and the expected acceleration may be used as an expected travelling parameter.

It should be noted that, for a same candidate travelling plan for the vehicle, the obstacle may avoid a collision with the vehicle at various expected accelerations. For example, when the vehicle travels according to a same plan, the obstacle may exceed the vehicle with an acceleration of 2 m/s², or exceed the vehicle with an acceleration of 3 m/s², or avoid the vehicle with a deceleration of 3 m/s².

Therefore, when the obstacle avoids the vehicle, Expression (8) needs to be met.

$$a_{obs} < a_{max}, \qquad \text{Expression (8)}$$

where $a_{max}$ represents a maximum acceleration of the obstacle.

When the obstacle does not avoid the vehicle, Expression (9) needs to be met.

$$a_{obs} > a_{min}, \qquad \text{Expression (9)}$$

where $a_{min}$ represents a minimum acceleration of the obstacle.

In addition, Expression (10) needs to be met.

$$a_{obs\_init} - a_{obs\_buffer} < a_{obs} < a_{obs\_init} + a_{obs\_buffer}, \qquad \text{Expression (10)}$$

where $a_{obs\_init}$ represents a current acceleration of the obstacle currently observed, and $a_{obs\_buffer}$ represents a maximum acceleration that the obstacle may adjust, that is, the acceleration threshold.

Expression (8) to Expression (10) may be processed to obtain the following.

When $(-\infty, a_{max}]$ has an intersection with $[a_{obs\_init} - a^{obs}_{buffer}, a_{obs\_init} + a_{obs\_buffer}]$, the expected acceleration of the obstacle may avoid a collision with the vehicle.

When $[a_{min}, +\infty)$ has an intersection with $[a_{obs\_init} - a_{obs_{buffer}}, a_{obs\_init} + a_{obs\_buffer}]$, the expected acceleration of the obstacle may avoid a collision with the vehicle.

Therefore, the predetermined condition includes a first predetermined condition or a second predetermined condition. The first predetermined condition includes: in a case of determining that the obstacle avoids the vehicle, a maximum value of the expected acceleration of the obstacle is less than or equal to a difference between the current acceleration of the obstacle and the acceleration threshold. The second predetermined condition includes: in a case of determining that the obstacle does not avoid the vehicle, a minimum value of the expected acceleration of the obstacle is greater than or equal to a sum of the current acceleration of the obstacle and the acceleration threshold. In embodiments of the present disclosure, whether the predetermined condition is met or not may be determined according to the expected acceleration of the obstacle, a movement trend of the obstacle may be accurately determined, so that the accuracy of the target travelling plan for the vehicle may be ensured.

According to other embodiments of the present disclosure, the predetermined condition may include a third predetermined condition or a fourth predetermined condition.

The third predetermined condition may include that Expression (11) is met in a case of determining that the obstacle avoids the vehicle, $$thw_{obs\_t1} - thw_{adc\_t1} < thw_{obs\_t2} - thw_{adc\_t2}. \qquad \text{Expression (11)}$$

The fourth predetermined condition may include that Expression (12) is met in a case of determining that the obstacle does not avoid the vehicle, $$thw_{obs\_t1} - thw_{adc\_t1} > thw_{obs\_t2} - thw_{adc\_t2}, \qquad \text{Expression (12)}$$

where $thw_{obs\_t1}$ represents a ratio of a travelling distance to a travelling speed of the obstacle from a first time instant to the target convergence location, $thw_{adc\_t1}$ represents a ratio of a travelling distance to a travelling speed of the vehicle from the first time instant to the target convergence location, $thw_{obs\_t2}$ represents a ratio of a travelling distance to a travelling speed of the obstacle from the second time instant to the target convergence location, $thw_{adc\_t2}$ represents a ratio of a travelling distance to a travelling speed of the vehicle from the second time instant to the target convergence location, and the first time instant is before the second time instant.

In some embodiments, the first time instant may be the $0^{th}$ time instant, the second time instant may be the $$\left(\frac{1}{3}t_g\right)^{th}$$

time instant of the $$\left(\frac{1}{2}t_g\right)^{th}$$

time instant, the travelling parameter of the vehicle at the second time instant may be determined according to the candidate travelling plan for the vehicle, and the travelling parameter of the obstacle at the second time instant may be determined according to a movement pattern of the obstacle with a uniform acceleration. When Expression (11) or Expression (12) is met, it means that an avoidance or overtaking trend of the obstacle and the vehicle is more and more obvious. In embodiments of the present disclosure, the avoidance or overtaking trend of the obstacle and the vehicle is used as the predetermined condition, and the difference between the current travelling parameter and the expected travelling parameter of the obstacle may be evaluated accurately.

Figure 5:
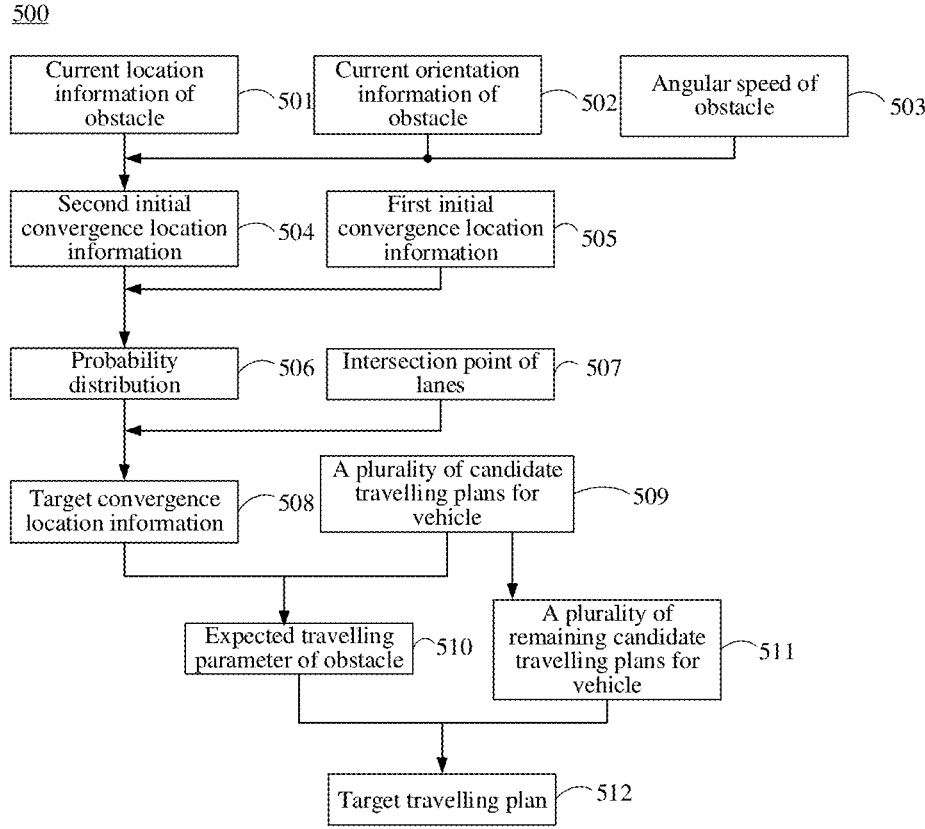
FIG. 5 shows a schematic diagram of a method for automatic driving at an intersection according to embodiments of the present disclosure.

FIG. 5 shows a schematic diagram of a method for automatic driving at an intersection according to embodiments of the present disclosure.

As shown in FIG. 5, in an embodiment 500 of the present disclosure, a second initial convergence location information 504 may be determined according to a current location information 501 of the obstacle, a current orientation information 502 of the obstacle, and an angular speed 503 of the obstacle.

Then, a probability distribution 506 indicating a correspondence between a candidate convergence location information and a probability may be determined according to a first initial convergence location information 505 and a second initial convergence location information 506. The probability distribution 506 may be determined, for example, using the Kalman filtering described above.

Then, an intersection point of lanes 507 is determined according to an information of a lane where the obstacle is located and an information of the lane where the vehicle is located.

Then, it may be determined whether a distance between a candidate convergence location information corresponding to a mean value of the probability distribution 506 and the intersection point of the lanes 507 is greater than or equal to a distance threshold.

If not, the candidate convergence location information corresponding to the mean value of the probability distribution 506 is determined as a target convergence location information 508.

If yes, at least one candidate convergence location information whose distance from the intersection point of the lanes 507 is less than or equal to the distance threshold is determined. Then, the target convergence location information 508 is determined from the at least one candidate convergence location information according to the probability distribution 506. For example, a candidate convergence location information corresponding to a maximum probability value may be determined as the target convergence location information.

Then, for each of the plurality of candidate travelling plans 509 for the vehicle, an expected travelling parameter 510 required for the obstacle to avoid a collision with the vehicle is determined as the expected travelling parameter 510 corresponding to each candidate travelling plan, according to the target convergence location information 508.

Then, when it is determined that the current travelling parameter of the obstacle and the expected travelling parameter 510 do not meet the predetermined condition, the candidate travelling plan corresponding to the expected travelling parameter 510 may be removed from the plurality of candidate travelling plans 509, and a plurality of remaining candidate travelling plans 511 for the vehicle may be obtained. For the predetermined condition, reference may be made to the aforementioned first predetermined condition, second predetermined condition, third predetermined condition and fourth predetermined condition.

Then, a target travelling plan 512 may be determined from the plurality of remaining candidate travelling plans 511. For example, evaluation values for the plurality of remaining candidate travelling plans may be calculated using the aforementioned safety evaluation value, comfort evaluation value and coherence evaluation value, and the remaining candidate travelling plan corresponding to the maximum evaluation value is determined as the target travelling plan. Then, the vehicle may be controlled to travel according to the target travelling plan.

Figure 6:
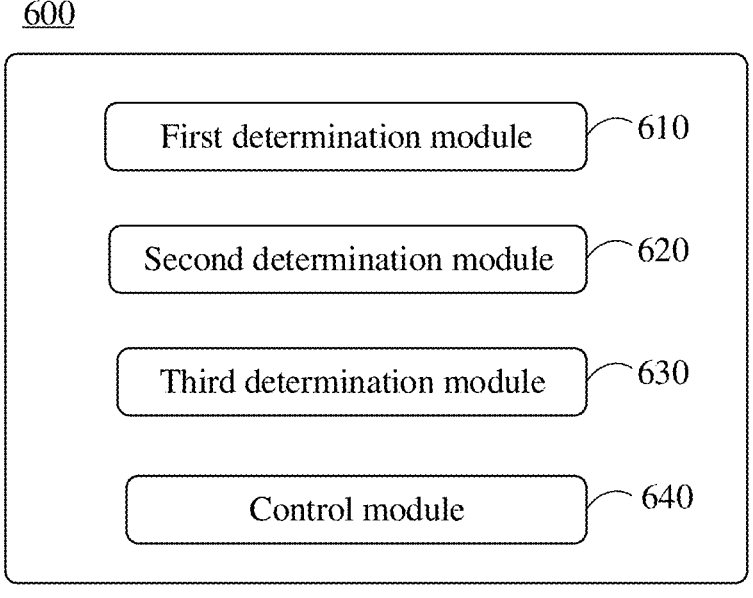
FIG. 6 shows a schematic structural block diagram of an apparatus for automatic driving at an intersection according to embodiments of the present disclosure.

FIG. 6 shows a schematic structural block diagram of an apparatus for automatic driving at an intersection according to embodiments of the present disclosure.

As shown in FIG. 6, an apparatus 600 for automatic driving at an intersection may include a first determination module 610, a second determination module 620, a third determination module 630, and a control module 640.

The first determination module 610 may be used to determine a first initial convergence location information between an obstacle and a vehicle, a current location information of the obstacle, and an orientation information of the obstacle.

The second determination module 620 may be used to determine a target convergence location information between the obstacle and the vehicle according to the first initial convergence location information, the current location information of the obstacle and the orientation information of the obstacle.

The third determination module 630 may be used to determine a target travelling plan from a plurality of candidate travelling plans for the vehicle according to the target convergence location information and a current travelling parameter of the obstacle.

The control module 640 may be used to control the automatic driving of the vehicle according to the target travelling plan.

According to other embodiments of the present disclosure, the second determination module includes a first determination sub-module and a second determination sub-module. The first determination sub-module may be used to determine a second initial convergence location information according to the current location information of the obstacle, a current orientation information of the obstacle and an angular speed of the obstacle. The second determination sub-module may be used to determine the target convergence location information according to the first initial convergence location information and the second initial convergence location information.

According to other embodiments of the present disclosure, the second determination sub-module includes a probability distribution determination unit and a target convergence location information determination unit. The probability distribution determination unit may be used to determine a probability distribution according to the first initial convergence location information and the second initial convergence location information, where the probability distribution indicates a correspondence between a candidate convergence location information and a probability. The target convergence location information determination unit may be used to determine the target convergence location information according to a mean value of the probability distribution.

According to other embodiments of the present disclosure, the target convergence location information determination unit includes a lane intersection determination sub-unit, a candidate convergence location information determination sub-unit, and a target convergence location information determination sub-unit. The lane intersection determination sub-unit may be used to determine an intersection point of lanes according to an information of a lane where the obstacle is located and an information of a lane where the vehicle is located. The candidate convergence location information determination sub-unit may be used to determine at least one candidate convergence location information in response to a determination that a distance between a candidate convergence location information corresponding to the mean value of the probability distribution and the intersection point of the lanes is greater than or equal to a distance threshold, where a distance between the at least one candidate convergence location information and the intersection point of the lanes is less than or equal to the distance threshold. The target convergence location information determination sub-unit may be used to determine the target convergence location information from the at least one candidate convergence location information according to the probability distribution.

According to other embodiments of the present disclosure, the third determination module includes an expected travelling parameter determination sub-module, a remaining candidate travelling plan determination sub-module, and a target travelling plan determination sub-module. The expected travelling parameter determination sub-module may be used to determine, for each candidate travelling plan of the plurality of candidate travelling plans, an expected travelling parameter required for the obstacle to avoid a collision with the vehicle as an expected travelling parameter corresponding to the candidate travelling plan, according to the target convergence location information. The remaining candidate travelling plan determination sub-module may be used to: in response to a determination that the current travelling parameter of the obstacle and the expected travelling parameter do not meet a predetermined condition, remove, from the plurality of candidate travelling plans, a candidate travelling plan corresponding to the expected travelling parameter, so as to obtain a plurality of remaining candidate travelling plans. The target travelling plan determination sub-module may be used to determine the target travelling plan from the plurality of remaining candidate travelling plans.

According to other embodiments of the present disclosure, the target travelling plan determination sub-module includes an evaluation value determination unit and a target travelling plan determination unit. The evaluation value determination unit may be used to determine, for each candidate travelling plan of the plurality of remaining candidate travelling plans, an evaluation value according to the expected travelling parameter of the obstacle corresponding to the candidate travelling plan, so as to obtain a plurality of evaluation values for the plurality of remaining candidate travelling plans. The target travelling plan determination unit may be used to determine the target travelling plan from the plurality of remaining candidate travelling plans according to the plurality of evaluation values.

According to other embodiments of the present disclosure, the expected travelling parameter determination sub-module includes an acceleration determination unit used to determine an expected acceleration of the obstacle according to a time length required for the vehicle to travel to the target convergence location information, a current speed of the obstacle, and a traveling distance information required for the obstacle to travel to the target convergence location information.

According to other embodiments of the present disclosure, the predetermined condition includes that: a maximum value of the expected acceleration of the obstacle is less than or equal to a difference between a current acceleration of the obstacle and an acceleration threshold, in response to a determination that the obstacle avoids the vehicle; or a minimum value of the expected acceleration of the obstacle is greater than or equal to a sum of the current acceleration of the obstacle and the acceleration threshold, in response to a determination that the obstacle does not avoid the vehicle.

According to other embodiments of the present disclosure, the predetermined condition includes: meeting a first predetermined expression in response to a determination that the obstacle avoids the vehicle; or meeting a second predetermined expression in response to a determination that the obstacle does not avoid the vehicle. The first predetermined expression is: $\text{thw}_{obs\_t1} - \text{thw}_{adc\_t1} < \text{thw}_{obs\_t2}$ $\text{thw}_{adc\_t2}$ the second predetermined expression is: $\text{thw}_{obs\_t1} - \text{thw}_{adc\_t1} > \text{thw}_{obs\_t2} - \text{thw}_{adc\_t2}$, $\text{thw}_{obs\_t1}$ represents a ratio of a travelling distance to a travelling speed of the obstacle from a first time instant to the target convergence location, $\text{thw}_{adc\_t1}$ represents a ratio of a travelling distance to a travelling speed of the vehicle from the first time instant to the target convergence location, $\text{thw}_{obs\_t2}$ represents a ratio of a travelling distance to a travelling speed of the obstacle from a second time instant to the target convergence location, $\text{thw}_{adc\_t2}$ represents a ratio of a travelling distance to a travelling speed of the vehicle from the second time instant to the target convergence location, and the first time instant is before the second time instant.

In the technical solution of the present disclosure, an acquisition, a storage, a use, a processing, a transmission, a provision and a disclosure of location information involved comply with provisions of relevant laws and regulations, and do not violate public order and good custom.

In the technical solution of the present disclosure, the acquisition or collection of user personal information has been authorized or allowed by users.

According to embodiments of the present disclosure, the present disclosure further provides an electronic device, including: at least one processor; and a memory communicatively connected to the at least one processor, the memory stores instructions executable by the at least one processor, and the instructions, when executed by the at least one processor, are configured to cause the at least one processor to implement the method for automatic driving at the intersection described above.

According to embodiments of the present disclosure, the present disclosure further provides a non-transitory computer-readable storage medium having computer instructions therein, and the computer instructions are used to cause a computer system to implement the method for automatic driving at the intersection described above.

According to embodiments of the present disclosure, the present disclosure further provides a computer program product containing a computer program, and the computer program, when executed by a processor, is configured to cause the processor to implement the method for automatic driving at the intersection described above.

According to embodiments of the present disclosure, the present disclosure further provides an automatic driving vehicle including the electronic device described above.

Figure 7:
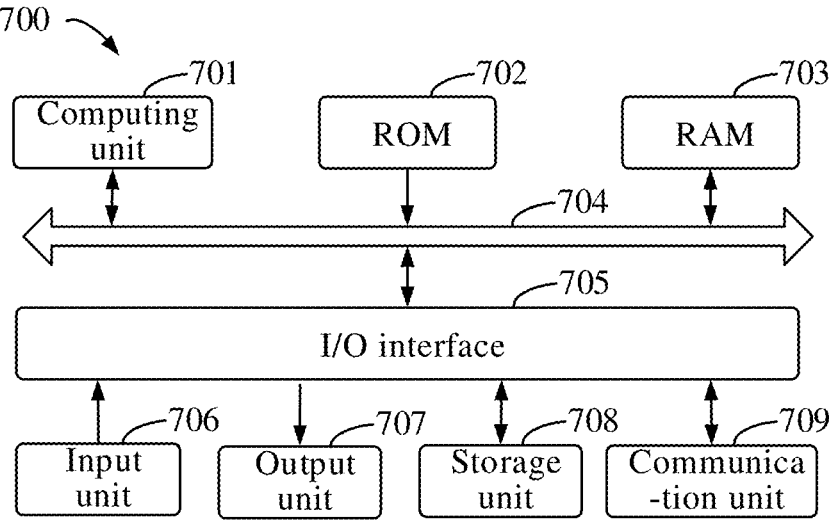
FIG. 7 shows a structural block diagram of an electronic device for implementing a method for automatic driving at an intersection according to embodiments of the present disclosure.

FIG. 7 shows a schematic block diagram of an exemplary electronic device 700 for implementing embodiments of the present disclosure. The electronic device 700 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the electronic device 700 may also be stored. The computing unit 701, the ROM 702 and the RAM 703 are connected to each other through a bus 704. An input/output (I/O) interface 705 is also connected to the bus 704.

A plurality of components in the electronic device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the electronic device 700 to exchange information/data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and steps described above, such as the method for automatic driving at the intersection. For example, in some embodiments, the method for automatic driving at the intersection may be implemented as a computer software program which is tangibly embodied in a machine-readable medium, such as the storage unit 708. In some embodiments, the computer program may be partially or entirely loaded and/or installed in the electronic device 700 via the ROM 702 and/or the communication unit 709. The computer program, when loaded in the RAM 703 and executed by the computing unit 701, may execute one or more steps in the method for automatic driving at the intersection described above. Alternatively, in other embodiments, the computing unit 701 may be configured to perform the method for automatic driving at the intersection by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method for automatic driving at an intersection, comprising:

determining a first initial convergence location information between an obstacle and a vehicle, a current location information of the obstacle, and an orientation information of the obstacle;

determining a target convergence location information between the obstacle and the vehicle according to the first initial convergence location information, the current location information of the obstacle and the orientation information of the obstacle;

determining a target travelling plan from a plurality of candidate travelling plans for the vehicle according to the target convergence location information and a current travelling parameter of the obstacle; and controlling the automatic driving of the vehicle according to the target travelling plan, wherein the determining a target travelling plan from a plurality of candidate travelling plans for the vehicle according to the target convergence location information and a current travelling parameter of the obstacle comprises:

determining, for each candidate travelling plan of the plurality of candidate travelling plans, an expected travelling parameter required for the obstacle to avoid a collision with the vehicle as an expected travelling parameter corresponding to the candidate travelling plan, according to the target convergence location information;

in response to a determination that the current travelling parameter of the obstacle and the expected travelling parameter do not meet a predetermined condition, removing, from the plurality of candidate travelling plans, a candidate travelling plan corresponding to the expected travelling parameter, so as to obtain a plurality of remaining candidate travelling plans; and determining the target travelling plan from the plurality of remaining candidate travelling plans, wherein the determining an expected travelling parameter required for the obstacle to avoid a collision with the vehicle according to the target convergence location information comprises:

determining an expected acceleration of the obstacle according to a time length required for the vehicle to travel to the target convergence location information, a current speed of the obstacle, and a traveling distance information required for the obstacle to travel to the target convergence location information, and wherein the predetermined condition comprises:

meeting a first predetermined expression in response to a determination that the obstacle avoids the vehicle; or meeting a second predetermined expression in response to a determination that the obstacle does not avoid the vehicle, wherein the first predetermined expression is: $thw_{obs\_t1}-thw_{adc\_t1}<thw_{obs\_t2}-thw_{adc\_t2}$, the second predetermined expression is: $thw_{obs\_t1}-thw_{adc\_t1}>thw_{obs\_t2}-thw_{adc\_t2}$, $thw_{obs\_t1}$ represents a ratio of a travelling distance to a travelling speed of the obstacle from a first time instant to the target convergence location, $thw_{adc\_t1}$ represents a ratio of a travelling distance to a travelling speed of the vehicle from the first time instant to the target convergence location, $thw_{obs\_t2}$ represents a ratio of a travelling distance to a travelling speed of the obstacle from a second time instant to the target convergence location, $thw_{adc\_t2}$ represents a ratio of a travelling distance to a travelling speed of the vehicle from the second time instant to the target convergence location, and the first time instant is before the second time instant.

2. The method according to claim 1, wherein the determining a target convergence location information between the obstacle and the vehicle according to the first initial convergence location information, the current location information of the obstacle and the orientation information of the obstacle comprises:

determining a second initial convergence location information according to the current location information of the obstacle, a current orientation information of the obstacle and an angular speed of the obstacle; and determining the target convergence location information according to the first initial convergence location information and the second initial convergence location information.

3. The method according to claim 2, wherein the determining the target convergence location information according to the first initial convergence location information and the second initial convergence location information comprises:

determining a probability distribution according to the first initial convergence location information and the second initial convergence location information, wherein the probability distribution indicates a correspondence between a candidate convergence location information and a probability; and determining the target convergence location information according to a mean value of the probability distribution.

4. The method according to claim 3, wherein the determining the target convergence location information according to a mean value of the probability distribution comprises:

determining an intersection point of lanes according to an information of a lane where the obstacle is located and an information of a lane where the vehicle is located;

determining at least one candidate convergence location information in response to a determination that a distance between a candidate convergence location information corresponding to the mean value of the probability distribution and the intersection point of the lanes is greater than or equal to a distance threshold, wherein a distance between the at least one candidate convergence location information and the intersection point of the lanes is less than or equal to the distance threshold; and determining the target convergence location information from the at least one candidate convergence location information according to the probability distribution.

5. The method according to claim 1, wherein the determining the target travelling plan from the plurality of remaining candidate travelling plans comprises:

determining, for each candidate travelling plan of the plurality of remaining candidate travelling plans, an evaluation value according to the expected travelling parameter of the obstacle corresponding to the candidate travelling plan, so as to obtain a plurality of evaluation values for the plurality of remaining candidate travelling plans; and determining the target travelling plan from the plurality of remaining candidate travelling plans according to the plurality of evaluation values.

6. The method according to claim 1, wherein the predetermined condition further comprises that:

a maximum value of the expected acceleration of the obstacle is less than or equal to a difference between a current acceleration of the obstacle and an acceleration threshold, in response to a determination that the obstacle avoids the vehicle; or a minimum value of the expected acceleration of the obstacle is greater than or equal to a sum of the current acceleration of the obstacle and the acceleration threshold, in response to a determination that the obstacle does not avoid the vehicle.

7. An electronic device, comprising:

at least one processor; and a memory communicatively connected to the at least one processor, wherein the memory stores instructions executable by the at least one processor, and the instructions, when executed by the at least one processor, are configured to cause the at least one processor to at least:

determine a first initial convergence location information between an obstacle and a vehicle, a current location information of the obstacle, and an orientation information of the obstacle;

determine a target convergence location information between the obstacle and the vehicle according to the first initial convergence location information, the current location information of the obstacle and the orientation information of the obstacle;

determine a target travelling plan from a plurality of candidate travelling plans for the vehicle according to the target convergence location information and a current travelling parameter of the obstacle; and control the automatic driving of the vehicle according to the target travelling plan, wherein the instructions are further configured to cause the at least one processor to at least:

determine, for each candidate travelling plan of the plurality of candidate travelling plans, an expected travelling parameter required for the obstacle to avoid a collision with the vehicle as an expected travelling parameter corresponding to the candidate travelling plan, according to the target convergence location information;

in response to a determination that the current travelling parameter of the obstacle and the expected travelling parameter do not meet a predetermined condition, remove, from the plurality of candidate travelling plans, a candidate travelling plan corresponding to the expected travelling parameter, so as to obtain a plurality of remaining candidate travelling plans; and determine the target travelling plan from the plurality of remaining candidate travelling plans, wherein the instructions are further configured to cause the at least one processor to at least:

determine an expected acceleration of the obstacle according to a time length required for the vehicle to travel to the target convergence location information, a current speed of the obstacle, and a traveling distance information required for the obstacle to travel to the target convergence location information, and wherein the predetermined condition comprises:

meeting a first predetermined expression in response to a determination that the obstacle avoids the vehicle; or meeting a second predetermined expression in response to a determination that the obstacle does not avoid the vehicle, wherein the first predetermined expression is: $\text{thw}_{obs\_t1}-\text{thw}_{adc\_t1}<\text{thw}_{obs\_t2}-\text{thw}_{adc\_t2}$, the second predetermined expression is: $\text{thw}_{obs\_t1}-\text{thw}_{adc\_t1}>\text{thw}_{obs\_t2}-\text{thw}_{adc\_t2}$, $\text{thw}_{obs\_t1}$ represents a ratio of a travelling distance to a travelling speed of the obstacle from a first time instant to the target convergence location, $\text{thw}_{adc\_t1}$ represents a ratio of a travelling distance to a travelling speed of the vehicle from the first time instant to the target convergence location, $\text{thw}_{obs\_t2}$ represents a ratio of a travelling distance to a travelling speed of the obstacle from a second time instant to the target convergence location, $\text{thw}_{adc\_t2}$ represents a ratio of a travelling distance to a travelling speed of the vehicle from the second time instant to the target convergence location, and the first time instant is before the second time instant.

8. The electronic device according to claim 7, wherein the instructions are further configured to cause the at least one processor to at least:

determine a second initial convergence location information according to the current location information of the obstacle, a current orientation information of the obstacle and an angular speed of the obstacle; and determine the target convergence location information according to the first initial convergence location information and the second initial convergence location information.

9. The electronic device according to claim 8, wherein the instructions are further configured to cause the at least one processor to at least:

determine a probability distribution according to the first initial convergence location information and the second initial convergence location information, wherein the probability distribution indicates a correspondence between a candidate convergence location information and a probability; and determine the target convergence location information according to a mean value of the probability distribution.

10. The electronic device according to claim 9, wherein the instructions are further configured to cause the at least one processor to at least:

determine an intersection point of lanes according to an information of a lane where the obstacle is located and an information of a lane where the vehicle is located;

determine at least one candidate convergence location information in response to a determination that a distance between a candidate convergence location information corresponding to the mean value of the probability distribution and the intersection point of the lanes is greater than or equal to a distance threshold, wherein a distance between the at least one candidate convergence location information and the intersection point of the lanes is less than or equal to the distance threshold; and determine the target convergence location information from the at least one candidate convergence location information according to the probability distribution.

11. The electronic device according to claim 7, wherein the instructions are further configured to cause the at least one processor to at least:

determine, for each candidate travelling plan of the plurality of remaining candidate travelling plans, an evaluation value according to the expected travelling parameter of the obstacle corresponding to the candidate travelling plan, so as to obtain a plurality of evaluation values for the plurality of remaining candidate travelling plans; and determine the target travelling plan from the plurality of remaining candidate travelling plans according to the plurality of evaluation values.

12. The electronic device according to claim 7, wherein the predetermined condition further comprises that:

a maximum value of the expected acceleration of the obstacle is less than or equal to a difference between a current acceleration of the obstacle and an acceleration threshold, in response to a determination that the obstacle avoids the vehicle; or a minimum value of the expected acceleration of the obstacle is greater than or equal to a sum of the current acceleration of the obstacle and the acceleration threshold, in response to a determination that the obstacle does not avoid the vehicle.

13. An automatic driving vehicle, comprising the electronic device according to claim 7.

14. A non-transitory computer-readable storage medium having computer instructions therein, wherein the computer instructions are configured to cause a computer system to at least:

determine a first initial convergence location information between an obstacle and a vehicle, a current location information of the obstacle, and an orientation information of the obstacle;

determine a target convergence location information between the obstacle and the vehicle according to the first initial convergence location information, the current location information of the obstacle and the orientation information of the obstacle;

determine a target travelling plan from a plurality of candidate travelling plans for the vehicle according to the target convergence location information and a current travelling parameter of the obstacle; and control the automatic driving of the vehicle according to the target travelling plan, wherein the computer instructions are further configured to cause the computer system to at least:

determine, for each candidate travelling plan of the plurality of candidate travelling plans, an expected travelling parameter required for the obstacle to avoid a collision with the vehicle as an expected travelling parameter corresponding to the candidate travelling plan, according to the target convergence location information;

in response to a determination that the current travelling parameter of the obstacle and the expected travelling parameter do not meet a predetermined condition, remove, from the plurality of candidate travelling plans, a candidate travelling plan corresponding to the expected travelling parameter, so as to obtain a plurality of remaining candidate travelling plans; and determine the target travelling plan from the plurality of remaining candidate travelling plans, wherein the computer instructions are further configured to cause the computer system to at least:

determine an expected acceleration of the obstacle according to a time length required for the vehicle to travel to the target convergence location information, a current speed of the obstacle, and a traveling distance information required for the obstacle to travel to the target convergence location information, and wherein the predetermined condition comprises:

meeting a first predetermined expression in response to a determination that the obstacle avoids the vehicle; or meeting a second predetermined expression in response to a determination that the obstacle does not avoid the vehicle, wherein the first predetermined expression is: $\text{thw}_{obs\_t1} - \text{thw}_{adc\_t1} < \text{thw}_{obs\_t2} - \text{thw}_{adc\_t2}$, the second predetermined expression is: $\text{thw}_{obs\_t1} - \text{thw}_{adc\_t1} > \text{thw}_{obs\_t2} - \text{thw}_{adc\_t2}$, $\text{thw}_{obs\_t1}$ represents a ratio of a travelling distance to a travelling speed of the obstacle from a first time instant to the target convergence location, $\text{thw}_{adc\_t1}$ represents a ratio of a travelling distance to a travelling speed of the vehicle from the first time instant to the target convergence location, $\text{thw}_{obs\_t2}$ represents a ratio of a travelling distance to a travelling speed of the obstacle from a second time instant to the target convergence location, $\text{thw}_{adc\_t2}$ represents a ratio of a travelling distance to a travelling speed of the vehicle from the second time instant to the target convergence location, and the first time instant is before the second time instant.

* * * * *